United States Patent
Müller et al.

[15] 3,671,791
[45] June 20, 1972

[54] WIPER AND SLIP RING ASSEMBLY

[72] Inventors: Erwin Müller; Dino Bettini, both of Munich, Germany

[73] Assignee: Siemens Aktiengesellschaft, Munich, Germany

[22] Filed: March 16, 1971

[21] Appl. No.: 124,706

[30] Foreign Application Priority Data

March 20, 1970 Germany..................G 70 10 427.7

[52] U.S. Cl. ................................................310/219
[51] Int. Cl. ................................................H02k 13/00
[58] Field of Search..............310/219, 232, 229, 230, 241

[56] References Cited

UNITED STATES PATENTS

| | | | |
|---|---|---|---|
| 2,473,526 | 6/1949 | Hood | 310/232 |
| 2,931,999 | 4/1960 | Lemmerman | 310/232 |
| 740,166 | 9/1903 | McLauthlin | 310/232 |

FOREIGN PATENTS OR APPLICATIONS

| | | | |
|---|---|---|---|
| 304,921 | 5/1917 | Germany | 310/232 |
| 371,505 | 10/1963 | Switzerland | 310/219 |

Primary Examiner—J. D. Miller
Assistant Examiner—R. Skudy
Attorney—S. A. Giarrtana and Thomas W. Kennedy

[57] ABSTRACT

Synchro sliding springs of hairpin shape, the closed end of which is in the form of a ring that surrounds the greater part of its supporting pin and whose elastic opening is a little smaller than the actual diameter of the support pin.

3 Claims, 3 Drawing Figures

FIG. 1 PRIOR ART
FIG. 2
FIG. 3
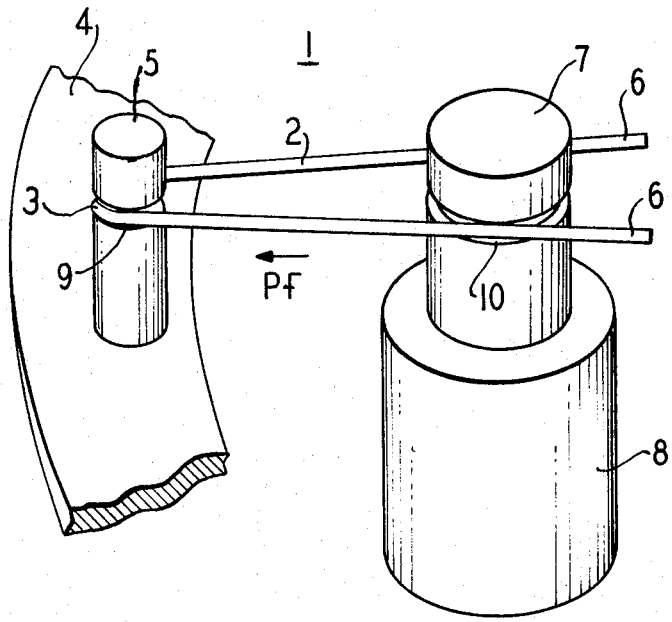
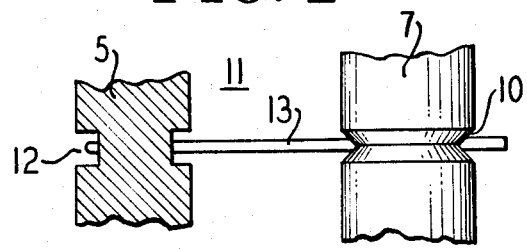
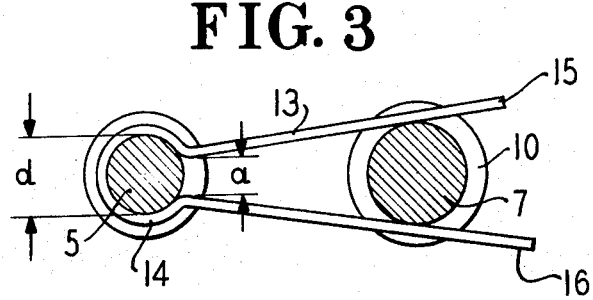
INVENTORS
ERWIN MULLER
DINO BETTINI
ATTORNEYS

WIPER AND SLIP RING ASSEMBLY

BACKGROUND OF THE INVENTION

A wiper and slip ring assembly is provided which comprises a wiper unit and a slip ring unit, the wiper unit including a wiper member composed of a resilient material and a support member having a mounting pin fixedly connected thereto, the mounting pin having an annular groove, the wiper member being a one-piece member having a U-shaped end portion received by the annular groove, the wiper member having a pair of arms at the other end thereof for engaging opposite sides of the slip ring unit, the pin groove having a bearing surface of substantially cylindrical shape, the wiper end portion having a discontinuous inner surface of subtantially cylindrical shape arranged to engage the bearing surface, the inner surface diameter being smaller than the bearing surface diameter whereby the wiper clamps the pin and forms a pivotal connection therebetween.

The prior art wiper unit includes a hairpin-shaped wiper and an insulating ring which has a support pin that supports the wiper. With such wiper unit, difficulties in assembly and adjustment continually recur, at the time when these are supposed to be installed into the finished assembly. The prior art wiper and slip ring assembly is shown in FIG. 1. The attached end 3 of this wiper surrounds a support pin 5 fasten-ed to an insulating ring 4, and its free arms 6 touch the slip ring 7 of the function generator 8. Both the support pin 5 and the slip ring 7 exhibit V-shaped annular grooves 9 and 10, in which the wiper is introduced. One problem with the conventional assembly is that the wiper two remains in the position shown with difficulty or not at all because of the springiness of the free arms 6, but instead that it is inclined to move in the direction of the arrow Pf to the left, if it is not fastened to the support pin 5. Thus for operation, the wiper two must be soldered to the support pin 5, and during the soldering process or subsequent resoldering processes, must always be pushed against the support pin 5, in order to be actually soldered into the desired position and to remain there.

It is therefore an object of the present invention to provide a wiper and slip ring assembly for rotating electrical machines, electrical function generators and similar machines provided with slip rings, which avoids the disadvantages of the previously mentioned wiper fastenings and nevertheless can be installed simply and at a minimal expense.

According to the present invention, a wiper and slip ring assembly is provided which comprises a wiper unit and a slip ring unit, said wiper unit including a wiper member composed of resilient material and a support member having a mounting pin fixedly connected thereto, said mounting pin having an annular groove, said wiper member being a one-piece member having a U-shaped end portion received by said annular groove, said wiper member having a pair of arms at the other end thereof for engaging opposite sides of said slip ring unit, said pin groove having a bearing surface of substantially cylindrical shape, said wiper end portion having a discontinuous inner surface of substantially cylindrical shape arranged to engage said bearing surface, said inner surface diameter being smaller than said bearing surface diameter whereby the wiper clamps the pin and forms a pivotal connection therebetween. Thus the attached end of the wiper is formed as a pivotal portion surrounding most of the support pin, with its expandable inlet opening slightly smaller than the effective diameter of the support pin.

Reference is made to the accompanying drawing for a better understanding of the objects of the present invention, wherein:

FIG. 1 is a perspective view of a wiper and slip ring assembly according to the prior art;

FIG. 2 is a vertical sectional view of a wiper and slip ring assembly according to the present invention; and FIG. 3 is a sectional view of the wiper and slip ring assembly according to the present invention.

Referring to FIGS. 2 and 3, one embodiment of the present invention comprises a wiper and slip ring assembly 11. Assembly 11 includes a wiper unit and a slip ring unit. The wiper unit has a wiper member 13 composed of a resilient material. The wiper unit also has an insulating ring support member 4 having a mounting pin 5 fixedly connected thereto. Pin 5 has an annular groove 12 having a rectangular shape in cross-section. Wiper member 13 is a one-piece member having a U-shaped end portion 14. Wiper member 13 also has a pair of arms 15, 16 at the other end thereof for engaging opposite sides of the slip ring unit 7 of a function generator 8. Slip ring unit 7 has a V-shaped groove 10 for receiving arms 15, 16. Groove 12 has a bearing surface of substantially cylindrical shape. Wiper end portion 14 has a discontinuous inner surface of substantially cylindrical shape. The bearing surface of groove 12 has an outer diameter d. The inner surface diameter of the wiper end portion 14 is slightly smaller than said outer diameter d so that wiper member 13 can clamp pin 5 and form a pivotal connection therebetween. Furthermore, it is advantageous if the free arms of the wiper are of different lengths, and finally, the free arms of the wiper can open up in approximately a V-shape.

Due to the slip ring-like formation of the attached end of the wiper, this is always held in the correct position, even without soldering. Thus, if contact problems do not require soldering, it can be eliminated altogether. In addition, the soldering of the wiper to the support pin after seating guarantees good electrical contact and increased reliability in operation. In particular, if one arm breaks, the second arm will still be held in the correct position. The rectangular profile of the cross section of groove 12, which has an axial width that is greater than the thickness of the wiper arms 15, 16, makes it possible to slide the wipers in the axial direction, so that they can be arranged exactly perpendicular to the axis of the slip ring, thus avoiding contact difficulties. The difference in length of the free arms of the wiper finally guarantees that the resonance frequencies of the individual arms of the wiper will be different, and thus avoid simultaneous breaking of contact by both arms.

Further details of the innovation can be seen in FIGS. 2 and 3, in which the mounting 11 according to the present invention is shown in front view and top view.

FIG. 2 shows the support pin 5 and the slip ring 7, and the wiper 13 disposed in the grooves 10 and 12. The annular groove 10 has a V-shaped profile, and the annular groove 12 a rectangular profile. The latter thus makes it possible to adjust the wiper 13 exactly perpendicular to the axis of the slip ring 7.

FIG. 3 shows the attached end 14 of the wiper 13, which, formed in the shape of a spring ring, surrounds most of the effective diameter d of the support pin 5, and whose elastic insertion opening a is slightly smaller than the diameter d of the support pin 5. The free arms 15, 16 of the wiper 13 are of different lengths, and thus guarantee that their resonance frequencies will be different, thus avoiding simultaneous breaking of contact.

Obviously, the wiper 13, which is made of wire or strip-shaped contact material, must be designed so that it can be pushed onto the support pin 5 without exceeding the limit of elasticity, fitting into the groove, and being held by the pin in the correct radial and axial positions.

This simple assembly presents great advantages in comparison to other known wipers which are firmly fixed in insulating material, since the insertion and imbedding of the wipers in the insulating material in the correct position involves high cost.

What is claimed is:

1. A wiper and slip ring assembly comprising:
   a wiper unit and a slip ring unit,
   said wiper unit including a wiper member composed of a resilient material and a support member having a mounting pin fixedly connected thereto,
   said mounting pin having an annular groove, said wiper member being a one-piece member having a U-shaped end portion received by said annular groove, said wiper member having a pair of arms at the other end thereof for engaging opposite sides of said slip ring unit, said pin groove having a bearing surface of substantially cylindrical shape, said bearing surface having a diameter of selective size, said wiper end portion having a discontinuous inner surface of substantially cylindrical shape arranged to engage said bearing surface, said inner surface having a diameter of selective size, said inner surface diameter being smaller than said bearing surface diameter whereby the wiper clamps the pin and forms a pivotal connection therebetween, said wiper end portion having the shape of a discontinuous ring, said wiper end portion having ring portions respectively connected to said arms, said ring portions having an opening therebetween of adjustable size, said wiper end portion having a selective spring rate whereby a selective force can be applied to said wiper end portion to enlarge said opening and to force said wiper end portion over said pin bearing surface, said opening having a size which is smaller than said pin surface diameter after release of said applied force to prevent separation of said wiper end portion from said pin bearing surface, said pin groove having a rectangular profile, said pin groove having a width of selective size, said groove width being larger than the thickness of said wiper end portion received therein, an wherein said slip ring unit has an annular groove, said slip ring groove having a V-shaped profile for urging said wiper end portion toward the center of said pia groove.

2. The assembly as claimed in claim 1, wherein one of said pair of wiper arms is longer than the other of said wiper arms, and wherein said wiper arms have respective thicknesses, each said wiper arm thickness being substantially uniform along its length, said wiper arm thicknesses being substantially equal.

3. The assembly as claimed in claim 2, wherein said wiper arms are substantially straight arms, said arms forming an angle therebetween of selective size, the size of said angle after assembly on said slip ring being relatively larger than the size of said angle before assembly on said slip ring.

* * * * *